July 23, 1929.  W. H. SILVER  1,721,716
LISTER
Filed April 27, 1925  7 Sheets-Sheet 1
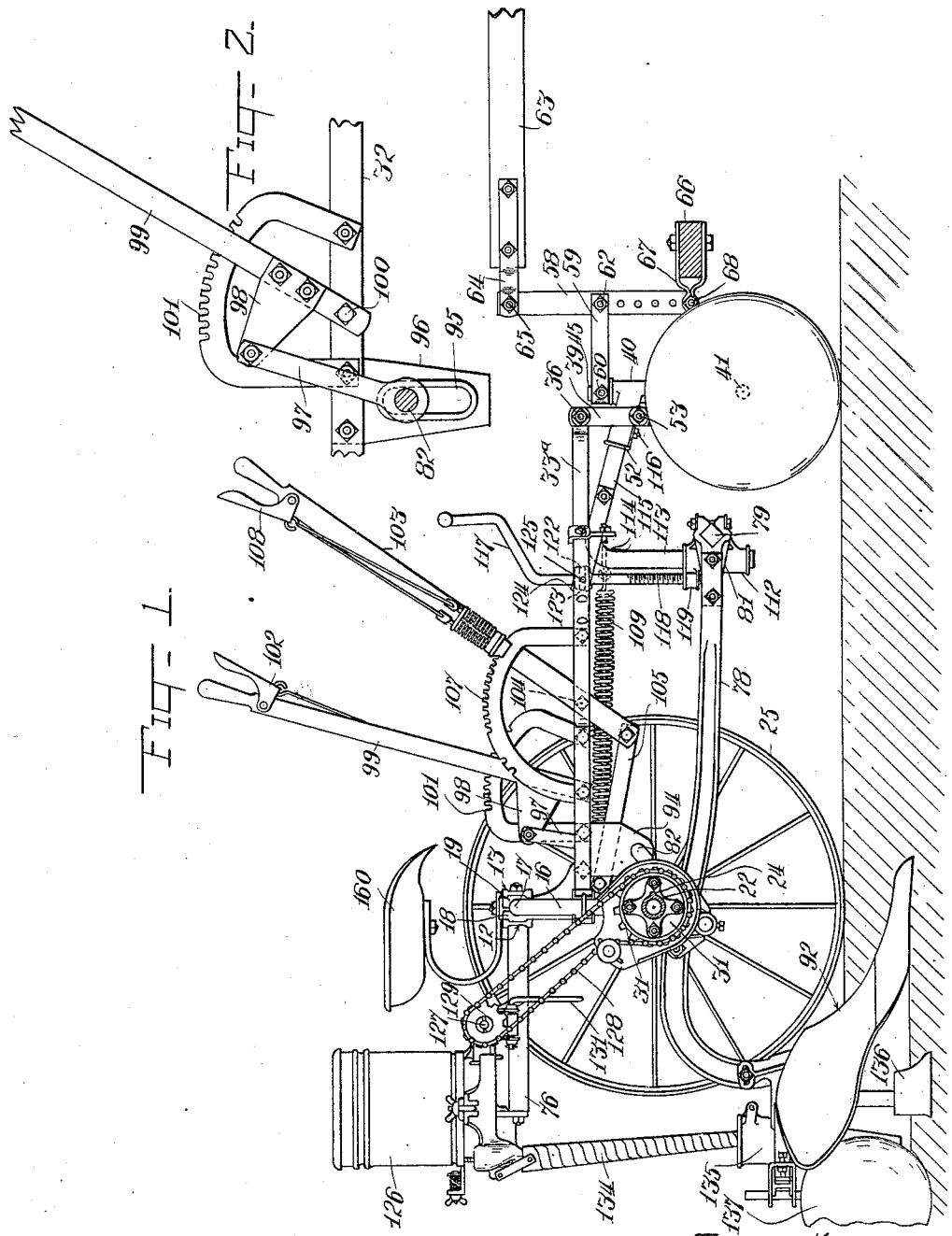

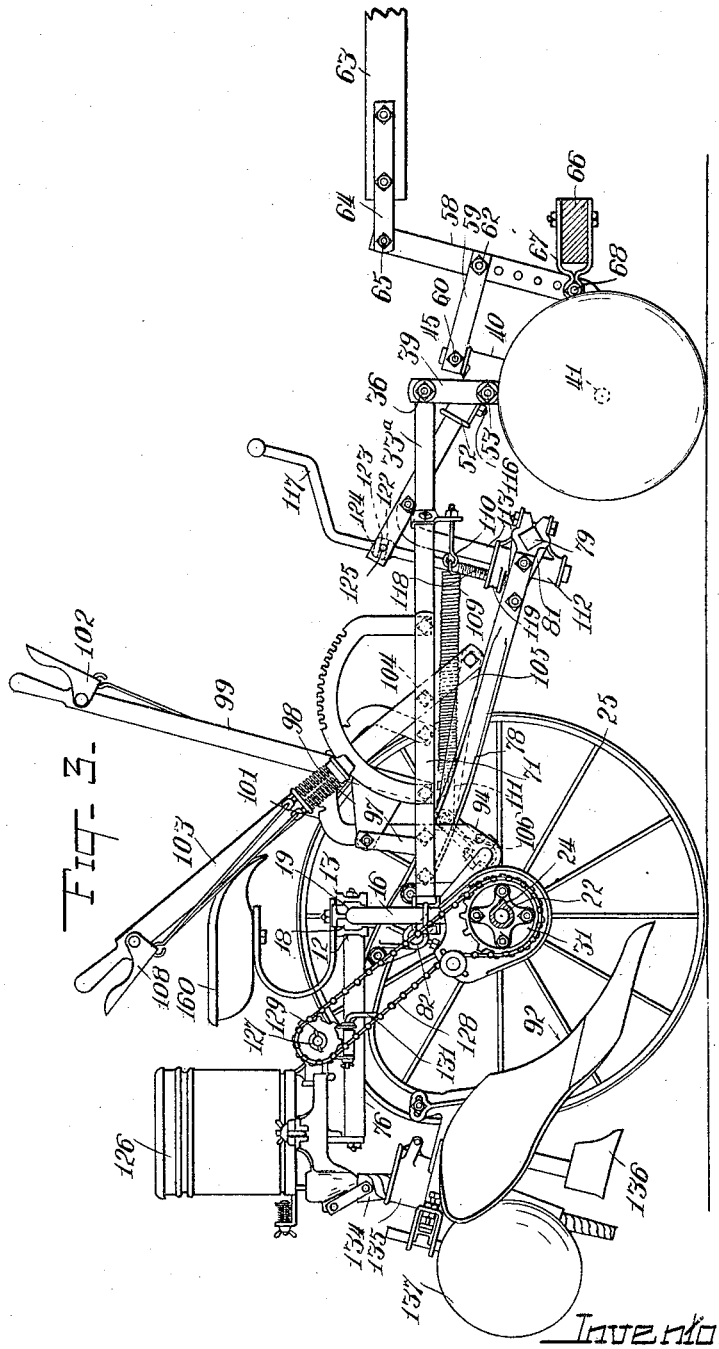

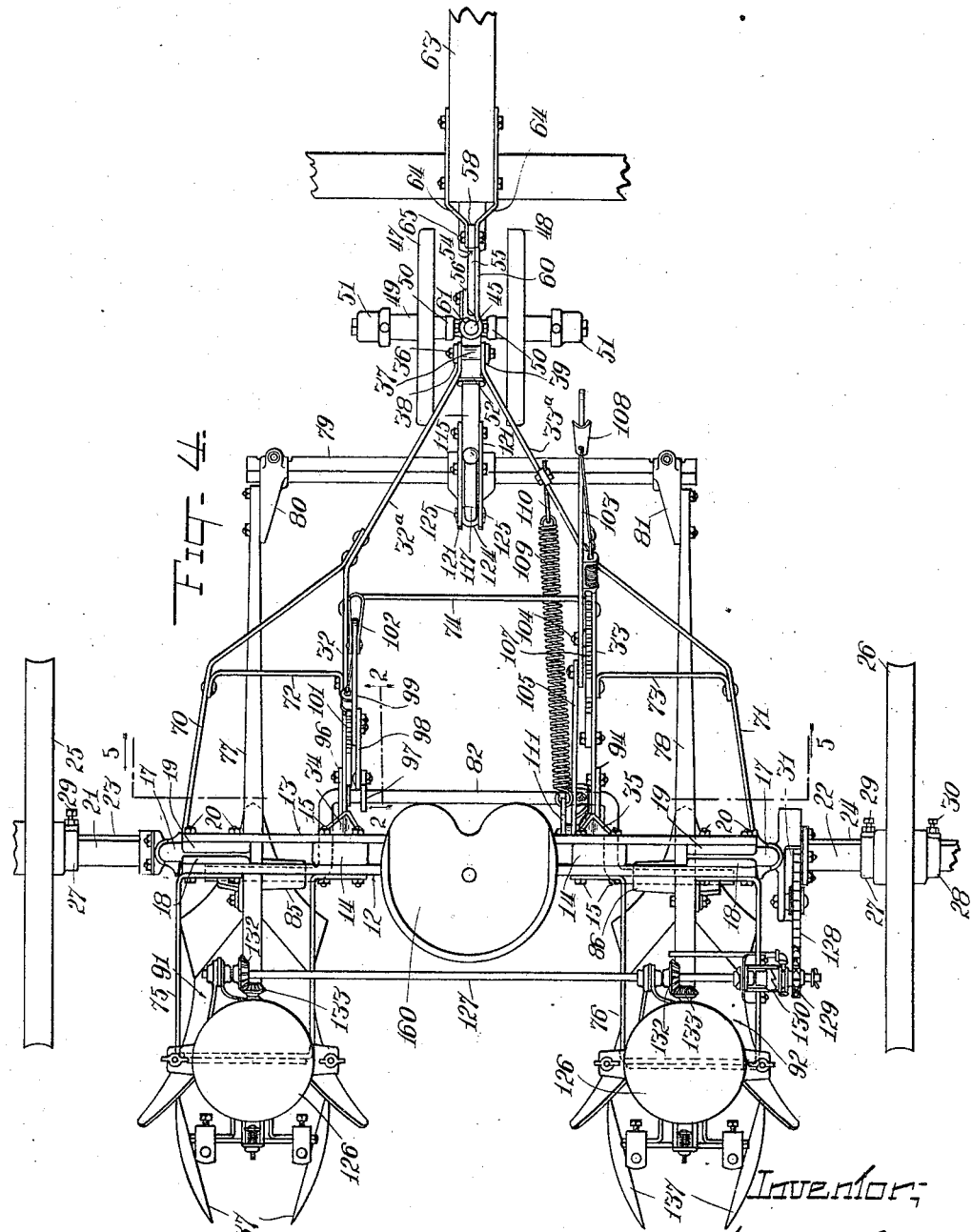

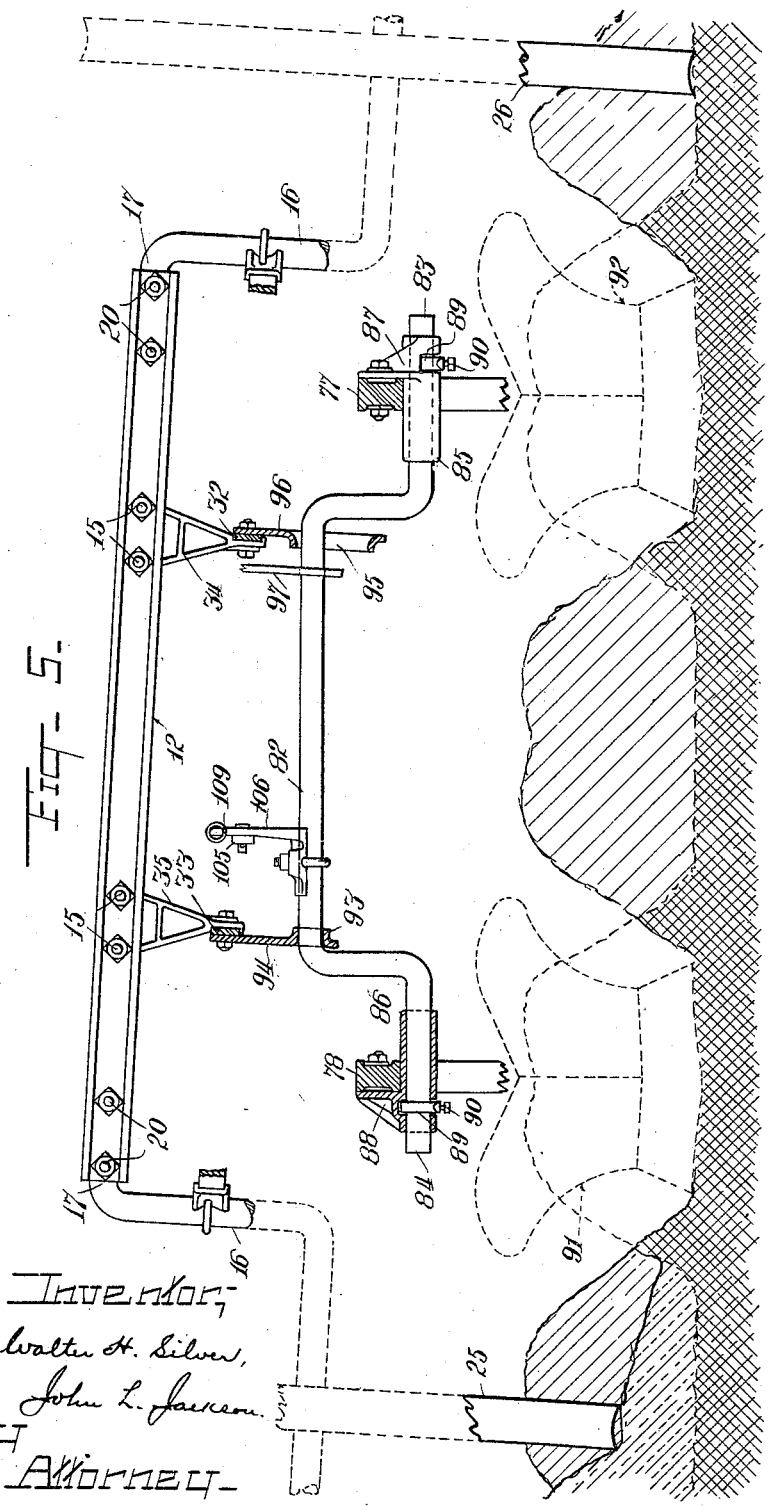

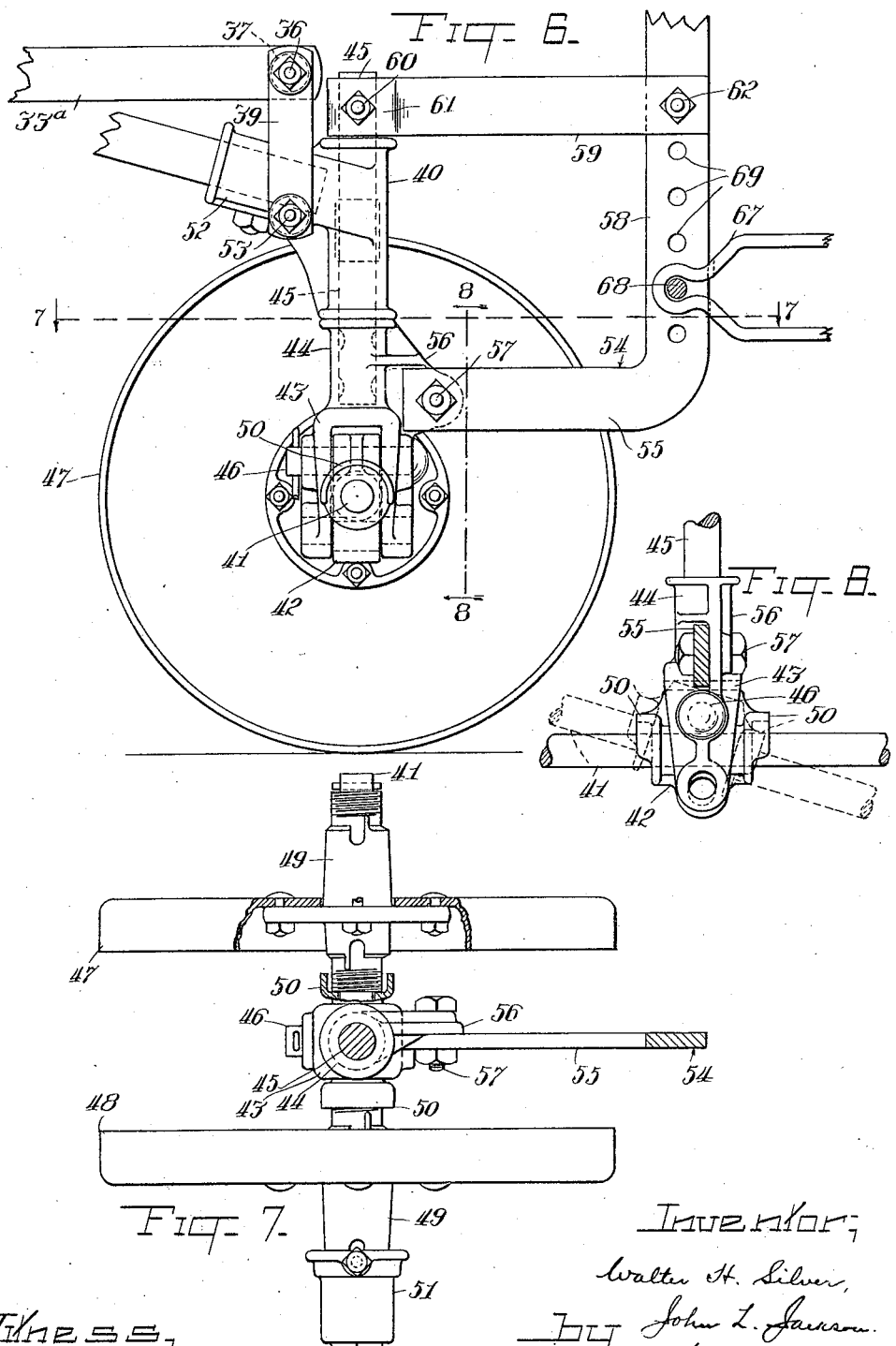

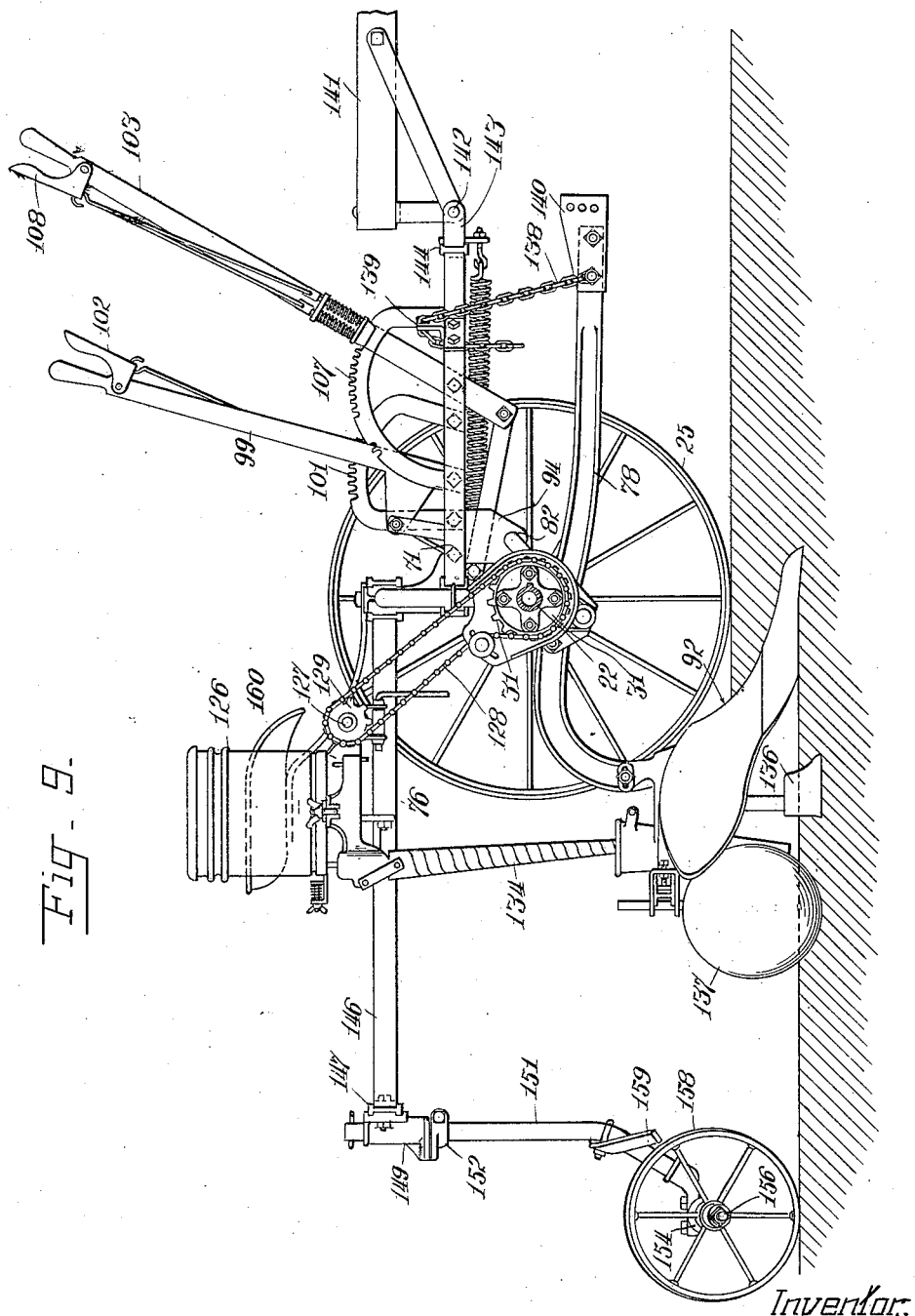

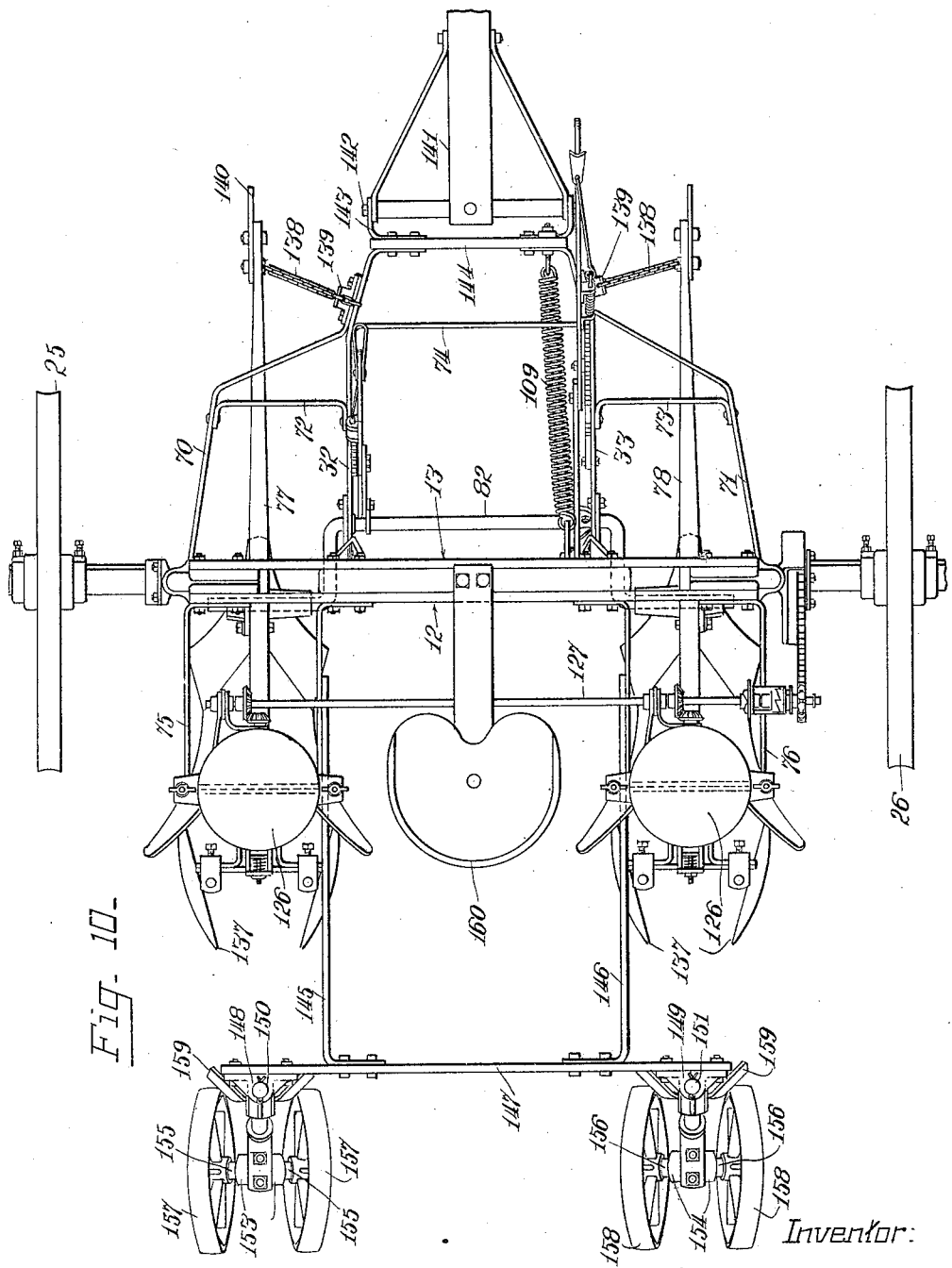

Patented July 23, 1929.

1,721,716

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

LISTER.

Application filed April 27, 1925. Serial No. 26,103.

My invention relates to listers, and while it has more especially to do with those designed for planting two rows at the same time, my improvements in many respects are also applicable to listers designed for planting single rows. The object of my invention is to provide certain improvements by which the general construction of the implement as a whole may be lightened; by which the implement will operate more steadily and handle more easily than prior listers of this type; by which the beams and plow bodies may be connected into a unitary framework that can be raised and lowered bodily as a rigid unit, and can be tilted laterally or about a longitudinal axis independently of the main frame for leveling purposes; by which the main supporting wheels may be permanently located with respect to the working position of the plow body or bodies so that a desirable balance can be maintained; by which the raising of the plow bodies out of the ground will not disturb the normal position of the main frame; by which the plow bodies may conveniently be adjusted to run level at all the depths at which the implement is capable of operating, and to improve the construction of implements of this kind in various other respects to be hereinafter pointed out. I accomplish this object as illustrated in the drawings and as hereinafter described. What I regard as new is set forth in the claims.

In the accompanying drawings,—

Fig. 1 is a side elevation of a two-row lister embodying my improvements, with the near wheel removed, the plow bodies being shown in their operative position;

Fig. 2 is a detail, being a partial longitudinal vertical section on line 2—2 of Fig. 4;

Fig. 3 is a view similar to Fig. 1, showing the plow bodies raised to their inoperative position;

Fig. 4 is a plan view;

Fig. 5 is a detail, being a partial transverse vertical section on line 5—5 of Fig. 4;

Fig. 6 is an enlarged detail illustrating the fore-truck with one wheel removed, and the draft connections thereof;

Fig. 7 is a horizontal section on line 7—7 of Fig. 6 with some parts broken away;

Fig. 8 is a partial transverse vertical section on line 8—8 of Fig. 6;

Fig. 9 is a side elevation with the near wheel removed, illustrating a modified construction to adapt the implement for use in planting corn, the arrangement shown in the previous figures being that used on implements intended for use on wheat lands; and Fig. 10 is a plan view of the construction shown in Fig. 9.

In the embodiment of my invention illustrated in Figs. 1 to 8, inclusive, there is a main frame that comprises an arched axle, preferably composed of two horizontally disposed parallel bars 12, 13 spaced apart and rigidly connected together in any suitable way, as by spacing blocks 14 and bolts 15, best shown in Fig. 4. These bars extend transversely of the main frame, and at their ends are provided with cranks 16, the upper horizontal arms 17 of which fit between clamping blocks 18, 19 having concave inner faces adapted to fit around the ends of said cranks, which blocks are disposed between the end portions of the bars 12, 13, and are clamped tightly upon the crank ends by bolts 20, as best shown in Fig. 4. Thus the cranks are held firmly in position. The lower horizontal portions of said cranks form journals upon which are rotatably mounted sleeves 21, 22, said sleeves being provided with ribs or splines 23, 24 extending longitudinally thereof. Upon these sleeves are mounted carrying wheels 25, 26, which may be adjusted longitudinally thereof to vary the spacing between the wheels, and are held in their different positions of adjustment by collars 27, 28 fitted upon said sleeves at opposite sides of the wheel hubs, and are adapted to be secured in fixed position thereon by set screws 29, 30, as shown in Fig. 4. One of said sleeves, as 22, is provided with a sprocket wheel 31 secured thereto in any suitable way, so that it will be rotated by the rotation of the wheel mounted on such sleeve, which in the illustrated construction is the wheel 26. The sprocket wheel 31 drives the seed delivery mechanism, as will be hereinafter described.

That portion of the main frame that extends forward from the arched axle comprises two forwardly extending parallel bars 32, 33, the rear ends of which are connected with brackets 34, 35, respectively, that are fixedly secured to and depend from the arched axle 11 at opposite sides of the center thereof, as shown in Fig. 5, while their forward ends converge, as shown at 32ª, 33ª in Fig. 4, and are secured together by a bolt 36 that passes transversely through the front end portions of said bars and through a spacing collar 37 which holds said ends a short distance apart. Said bolt also serves as a means for connecting vertically disposed links 38, 39 to the front ends of said bars, as shown in Figs. 4 and 6. These links serve to connect the front portion of the main frame with a sleeve 40 that provides a pivotal connection between the front portion of the main frame and a fore-truck that not only supports said frame, but also serves as gauging means, as will be hereinafter explained. It also serves to transmit the draft to the plow beams, as will presently be explained.

The construction of this fore-truck is best shown in Figs. 6, 7 and 8, from which it will be seen that it comprises a transverse shaft or axle 41 which at its longitudinal center is mounted in a block 42 pivotally supported to swing about a longitudinal axis, in a yoke 43 at the lower end of a bracket 44, the upper portion of which is in the form of a sleeve having a socket to receive the lower end of a spindle 45 on which the sleeve 40 is journaled. The lower end of said sleeve rests on the upper end of the bracket 44, as shown in Fig. 6. The block 42 is pivotally mounted in the yoke 43 on a pivot bolt 46 that extends fore and aft through registering holes in the arms of said yoke and through a corresponding hole in the block 42 near one end thereof. Preferably a similar hole is provided near the other end of said block, and a second set of holes is provided in the yoke 43 so that the bolt 46 may be mounted therein at different heights, to provide for vertically adjusting the position of the axle 41 with reference to the sleeve 40, thereby effecting vertical adjustment of the normal position of said sleeve and the front portion of the main frame. The axle 41 carries two wheels 47, 48 mounted thereon at opposite sides of the block 42, as shown in Fig. 7, the hubs 49 of said wheels being preferably extended inwardly to project into dust caps 50 carried by said block at opposite sides thereof, as best shown in Fig. 7. Also caps 51 are preferably provided at the outer ends of said hubs. I prefer to use disc wheels of the type shown in Figs. 6 and 7, but they may be of any other suitable design. By this construction it will be seen that the wheels 47, 48 may be turned laterally about a vertical axis to guide the implement, and they may also swing about the bolt 46 as a longitudinal axis, since the block 42 is capable of so swinging. This enables the truck wheels to accommodate themselves to inequalities in the ground without affecting the main frame of the implement.

The fore-truck is also adapted to swing relatively to the main frame about a transverse axis, since the links 38, 39 are pivotally connected with a rearward extension 52 of the sleeve 40 by a pivot bolt 53 that passes through the lower ends of said links and through a suitable bearing in said extension. The fore-truck is connected with the draft means, which may either be a team or a tractor, by means of an L-shaped bar 54, the lower horizontal arm 55 of which is connected with a forward extension 56 of the bracket 44 by a pivot bolt 57, as shown in Fig. 6, while the vertical arm 58 of said bar is connected by a horizontal bar 59 and a bolt 60 with the upper end of the spindle 45. As shown in Fig. 4, the rear end of the bar 59 is bent to form a loop 61 that embraces the upper end of the spindle 45, and the bolt 60 passes through such loop and through the upper end of said spindle, as shown in Fig. 6. The loop 61 lies immediately over the sleeve 40, and therefore the bolt 60 serves to hold said sleeve against vertical movement on the spindle 45. The forward end of the bar 59 is connected with the arm 58 intermediately of the length thereof by a bolt 62, and the upper end of said arm 58 is attached to a pole tongue 63 by straps 64 and a bolt 65. An evener 66 is adjustably connected with the lower portion of the arm 58 by a clevis 67 and bolt 68, said bolt being arranged to fit in any one of a number of holes 69 provided in the arm 58, as shown in Figs. 3 and 6, so that the point of attachment of the evener may be adjusted vertically. As will be hereinafter described, the draft is transmitted to the plow beams through the fore-truck, and the purpose of mounting said truck so that the spindle 45 may swing fore and aft about the pivot 53 is to permit the truck to accommodate itself to changes in position of the plow beams when the plows are raised or lowered, as will be apparent from a comparison of Figs. 1 and 3.

In addition to the parts of the main frame already described, it also comprises bracing members in the form of bars 70, 71, the rear ends of which are secured to the vertical portions of the cranks 17, while their forward ends converge and are secured to the parts 32ª, 33ª, as shown in Fig. 4. Intermediate braces 72, 73 are also provided between the bars 70 and 32 and the bars 71 and 33 respectively. Also, the bars 32, 33 are braced by a transverse brace 74. Back of the crank axle 11 the main frame comprises two rectangular frame members 75, 76 that extend rearwardly from the opposite end portions of said axle and support the seed delivery mechanism, as will be hereinafter described.

The wheeled carriage, consisting of the main frame, the supporting wheels 25, 26, and the fore-truck, serves as a carrier for a plow frame, and provides for its adjustment while at work, or for its transportation after the plows have been lifted out of operative position. The plow frame comprises two parallel beams 77, 78, the forward ends of which are fixedly connected to each other by a transverse bar 79 secured to said beams by brackets 80, 81, as shown in Fig. 4. Toward the rear the plow beams 77, 78 are connected by a bail or shaft 82, the end portions 83, 84 of which are in the form of cranks having terminal spindles on which are journaled sleeves 85, 86 that are fixedly connected with the beams 77, 78 by brackets 87, 88 which are preferably integral with said sleeves respectively, as shown in Fig. 5. The sleeves 85, 86 are held against endwise movement on their respective spindles by collars 89 fitted in recesses in said sleeves and secured to the spindles 83, 84 by set screws 90. This provides means by which the plow beams may readily be adjusted toward or from each other along the spindles 83, 84 to vary the space between rows. The plow beams are of the usual form, and carry lister plow bodies 91, 92 of any approved design.

The intermediate or offset portion of the bail 82 is journaled near one end thereof, usually the left hand end as viewed from the front of the implement, in a suitable bearing 93 carried by a bracket or hanger 94 that is secured to and depends from the bar 33 of the main frame, as best shown in Figs. 4 and 5. The opposite end of said offset portion of the bail 82 extends through an enlarged opening 95 in a bracket or hanger 96 that is secured to and depends from the bar 32 of the main frame, as shown in Fig. 5, so that, as viewed in Fig. 5, the right hand end portion of said bail may swing vertically substantially about the bearing 93 as an axis, the latter bearing being loose enough to permit this movement. By this construction, relatively speaking, the arched axle 11 and the bail 82 may be swung relatively to each other about a longitudinal axis, and consequently when the main frame is tilted laterally, or about a longitudinal axis, by reason of the wheels running on different levels, due to unevenness of the ground, the plow frame may be maintained in a level position, notwithstanding the lateral tilting of the arched axle, by moving the right hand end of said bail as viewed in Fig. 5 toward or from the arched axle. The plows may therefore be made to run level, notwithstanding inequalities in the ground. For conveniently making this adjustment the right hand end of said bail is connected by a link 97 with a laterally projecting arm 98 carried by a lever 99, best shown in Fig. 2. This lever is fulcrumed on the frame member 32 by means of a pivot bolt 100 that is provided with a notched sector 101 adapted to cooperate with the usual latch mechanism 102 carried by said lever to lock the lever in its different positions of adjustment, and thereby hold the bail 82 in fixed relation to the arched axle.

The plows are raised or lowered by rocking the bail 82 fore and aft, which of course moves its spindles 83, 84 up or down. This is accomplished by means of a lever 103 fulcrumed between its ends on the frame member 33 by a bolt 104. The lower end of said lever is connected by a link 105 with an arm 106 fixedly secured to the offset portion of the bail 82, as shown in Fig. 5. Obviously by moving the upper end of the lever 103 backward, the bail 82 will be rocked in a clockwise direction as viewed in Fig. 1, thereby lifting the plows. A notched sector 107 mounted on the frame bar 33 and adapted to cooperate with latch mechanism 108 carried by the lever 103 provides means for locking said lever in its different positions of adjustment. Said lever may therefore be used either to regulate the depth of plowing, or to lift the plows to transport position. Preferably a spring 109 is provided to aid in lifting the plows, one end of said spring being connected with the main frame in any suitable way, as by an adjustable eye-bolt 110, while the other end of said spring is connected with the arm 106 by a link 111, as shown in Fig. 4.

In order that the transverse bar 79 that connects the front ends of the beams 77, 78 may be vertically adjusted to make the plows run level fore and aft, or to tip their points up or down, said bar is provided midway of its length with a sleeve 112 which is fixedly secured thereto in any suitable way and is mounted to slide on the vertical arm 113 of a gooseneck draft connection 114 having a downwardly and forwardly projecting arm 115 that fits into a socket in the rearward extension 52 of the sleeve 40, as best shown in Figs. 1 and 6. A set screw 116 serves to secure the arm 115 in said socket. Both arms of the gooseneck 114 lie in the vertical plane of the median line of the implement, and therefore draft applied to the spindle 45 of the fore-truck is transmitted through said gooseneck to the central portion of the transverse bar 79, and through it to the plow beams equally. Furthermore, by adjusting the sleeve 112 vertically on the arm 113, the front ends of said beams may be moved up or down to any point desired within the permitted range, and the front ends of the beams may therefore be positioned with respect to the height of the bail spindles 83, 84 so that the plow bottoms may be held level, or their points may be tipped up or down. The sleeve 112 fits on the vertical arm 113 of the gooseneck loosely enough to permit such slight rocking of the bar 79 about a longitudinal axis as is necessary to accommodate the leveling adjustment of the plows hereinafter described. For adjusting the sleeve 112 vertically, I provide a crank 117, the lower end of which is screw threaded, as shown at 118 in Fig. 1, and works in an internally threaded boss 119 that projects rearwardly from the sleeve 112. The intermediate portion of said crank is rotatably supported by the gooseneck 114 by means of straps 121 fixedly secured at opposite sides of the arm 115 of said gooseneck and projecting rearwardly therefrom. The crank 117 extends between the separated rear ends of said straps, at which point it is provided with two annular ribs 122 spaced a short distance apart to form an annular groove 123 between them, as best shown in Figs. 1 and 3. A split collar 124, comprising complementary members having ends 125 that pass through holes in the straps 121, fits in said groove, and consequently holds the crank against endwise movement with reference to the straps 121, but permits rotation thereof. Cotters are preferably passed through the projecting ends 125 outside of the straps 121 to hold the ends of said straps together. By this construction the crank 117 is supported in a fixed position on the gooseneck and serves to hold the front ends of the beams at any point along the vertical arm 113 of said gooseneck at which they may be set, which position is not disturbed by the raising or lowering of the rear ends of the beams. The front ends of said beams may, however, be readily adjusted, as the operator may deem advisable. When the plow bottoms are raised above the ground for transport, the gooseneck 114 is rocked about the axle 41, as illustrated in Fig. 3, but this does not materially affect the vertical position of the main frame, owing to the link connection 38, 39 between said frame and the fore-truck. Furthermore, it will be noted that by the construction described the draft is not applied directly to the carriage or wheeled frame, but, as has been explained, is transmitted through the gooseneck to the plow frame, and through the bail 82 of said frame is communicated to the wheeled frame. In steering, lateral turning of the wheels of the fore-truck independently of the main frame is permitted, owing to the pivotal mounting on the spindle 45 of the sleeve 40 by which the front end portion of the main frame is supported on said truck. The front end portion of the plow carrying frame and the front end portion of the main frame may also be simultaneously adjusted vertically by vertically adjusting the bracket 44 with reference to the axle 41 by changing the bolt 46 from one of the holes in the yoke 43 to the other. As the sleeve 40 is supported by said bracket, adjustment of the latter vertically consequently raises or lowers said sleeve and thereby raises or lowers the gooseneck 114 to which the front end of the plow frame is attached, and through the links 39 raises or lowers the front portion of the main frame. By the construction described therefore, the front ends of the main frame and of the plow carrying frame can be simultaneously adjusted vertically, or, if desired, the plow carrying frame may be adjusted vertically independently of vertical adjustment of the main frame.

By providing a wheeled main frame with a bail that carries the plows and is adjustable relatively to the frame for leveling purposes, as described, I am able to connect the beams and plow bodies to form a unitary framework that can be rocked on the bail for raising and lowering it bodily as a rigid unit, and which can be tilted to raise or lower one side thereof relatively to the main frame for leveling purposes. The fore-truck supports the front portion of the main frame, and also serves as a gauge for the front ends of the beams with respect to the ground, and as the main supporting wheels are permanently located with respect to the working position of the plow bodies, a desirable balance is maintained, taking into account the weight of the gauge wheels, so that the machine runs steadily and may be handled more easily than in prior constructions with which I am familiar. By supporting the main frame on wheels or equivalent devices at longitudinally separated points, as by the wheels 25, 26, and the fore-truck, its position is not affected by adjustment of the plow carrying frame.

My improved machine may be equipped with any suitable means for delivering seed in the furrows made by the plow bodies, the mechanism for that purpose shown in the drawings being that which I prefer to employ. Such mechanism comprises a pair of seed receptacles 126, one at each side of the machine, having the usual seed measuring and delivering mechanism actuated by a transverse shaft 127 which is driven from the sprocket wheel 31 by a chain 128 and a sprocket wheel 129, the latter being loosely mounted on the shaft 127 and being adapted to be connected therewith by clutch mechanism 130, the inner member of the clutch being non-rotatably secured to the shaft 127, while the other member thereof is secured to the sprocket wheel 129. An arm 131 is provided arranged to be actuated by the plow beam 78, when it is raised to its transport position, in such manner that it will disconnect the members of the clutch 130 and stop the rotation of the shaft 127. Said shaft drives the seed dispensing devices in the receptacles 126 by means of bevel gears 132, 133 which need not be described specifically, as their operation is well understood by those familiar with the art. Obviously when the plows are in transport position, the delivery of seed should be stopped, and the construction described provides for automatically stopping it at that time, but in some circumstances farmers like to be able to stop the operation of the seed dispensing mechanism at pleasure and without lifting the plows clear of the ground, and this obviously may be readily accomplished by providing a manually operated lever, or equivalent device, adapted to trip the clutch mechanism which controls the operation of the shaft 127. After being delivered from the receptacles 26, the seeds drop through seed tubes 134 to spouts 135 telescopically associated with the tubes 134, and are directed by said spouts to the ground where they drop into the furrows left by sub-soilers 136 arranged back of the plow bodies 91, 92, as shown in Fig. 1. Pairs of covering discs 137 are provided back of the spouts 135, said discs being secured to the plow beams in any suitable way, either in fixed relation thereto or for vertical adjustment, as may be preferred. As both arrangements are well known in the art, and as my invention is not concerned with the manner in which said discs are mounted, further explanation as to them is not deemed necessary.

In Figs. 9 and 10 I have illustrated the leveling feature of my invention applied to a lister designed for use in corn territory. For use in planting corn, it is desirable that press wheels be provided for pressing the soil over the corn after it has been planted, and therefore instead of using the fore-truck employed on machines designed for planting cotton, such fore-truck is omitted and the rear portion of the main frame is extended rearwardly to form a support for the press wheels, which in that case constitute a rear truck that cooperates with the main wheels 25, 26 to support the main frame at longitudinally separated points, as in the construction shown in the earlier figures. The substitution of a rear truck for the fore-truck also makes certain other changes necessary or desirable, as will now be explained.

So far as the general construction of the main and plow frames and the mounting and adjustment of the bail are concerned, they are substantially as has been described in connection with the preceding figures, and that is true also as to the seed delivery mechanism. Corresponding parts of the machine illustrated in Figs. 9 and 10 are therefore indicated by the same reference numerals as those used in connection with the other figures. Instead, however, of connecting the front ends of the beams together by the cross-bar 79, and supporting said cross-bar on the gooseneck 114, as previously described, in the construction shown in Figs. 9 and 10 the front ends of the beams are suspended from the main frame by chains 138, the lower ends of which are secured to the forward ends of said beams, while the upper portions of said chains are hooked over notched plates 139 secured to the side members of the main frame, as shown in said figures. This provides a convenient means of adjusting the front ends of the beams vertically to correspond with the depth of plowing. By this means the plows may be made to run level, or their points may be tipped up or down, as the operator may prefer. The forward ends of the beams are provided with draft plates 140, to which clevises may be attached at different heights, and the front end of the main frame is connected with a tongue 141 by means of a pivot rod 142 mounted in arms 143 at the opposite ends of a transverse bar 144 which is secured to the front end portion of the main frame, as illustrated in Fig. 10.

The rear frame members 75, 76 support the seeding devices in the manner already described, but they are provided with extension bars 145, 146, best shown in Fig. 10, that are rigidly secured thereto and are provided at their rear ends with a transverse bar 147 that carries bracket 148, 149 at its ends. These brackets are in the form of sleeves that form bearings for the upper ends of spindles 150, 151 provided with collars 152 on which the brackets 148, 149 rest. The collars 152 are vertically adjustable on the spindles 150, 151, so that said spindles may be adjusted vertically with reference to the frame members 145, 146. At their lower ends said spindles are provided with bearings 153, 154 in which are mounted axles 155, 156, respectively, as shown in Fig. 10. Each of these axles carries a pair of press wheels 157, 158 so located as to press the soil over the planted seed. Preferably said wheels are provided with scrapers 159 to prevent the accumulation of dirt or trash thereon. Owing to the pivotal mounting of the spindles 150, 151, the press wheels operate as caster wheels and automatically follow the seed dropping mechanism along the planted rows. In this machine the adjustment for leveling is made in the same way as in that shown in the earlier figures, and the draft is transmitted to the wheeled frame in the same way, that is to say, through the bail rather than directly. The position of the driver's seat 160 is, however, slightly different, as in the construction shown in the earlier figures it is preferably located substantially over the arched axle, whereas in the arrangement shown in Figs. 9 and 10 it is placed a short distance back of such axle, to obtain a better balancing effect, in view of the substitution of a rear truck for the fore-truck.

It should be understood that although I have illustrated my invention as embodied in a two-row lister, many of the features of improvement shown and described may also be incorporated in a single row implement, and the claims hereinafter made are therefore to be construed accordingly.

What I claim as my invention and desire to secure by Letters Patent, is—

1. A lister comprising a main frame having an arched axle, supporting wheels carried by said axle, a truck longitudinally separated from said axle and pivotally connected with and supporting the front portion of said frame, plow carrying means, means connected with the arched portion of said axle for supporting said plow carrying means to rock about a transverse axis, and also to rock about a longitudinal axis relatively to said frame, a plow connected with said plow carrying means and with said frame, and adjustable vertically, and for leveling, respectively, by rocking of said plow carrying means about a transverse axis, or about a longitudinal axis, and devices operable to rock said plow carrying means.

2. A lister comprising a main frame having an arched axle, supporting wheels carried by said axle, a truck longitudinally separated from said axle, means pivotally connecting the front portion of said frame with said truck to permit relative longitudinal movement between said frame and truck, plow carrying means, means connected with the arched portion of said axle for supporting said plow carrying means to rock about a transverse axis, and also to rock about a longitudinal axis relatively to said frame, a plow connected with said plow carrying means and with said frame, and adjustable vertically, and for leveling, respectively, by rocking of said plow carrying means about a transverse axis, or about a longitudinal axis, and devices operable to rock said plow carrying means.

3. A lister comprising a main frame, front and rear supporting wheels therefor, a shaft intermediately supported by the main frame to rock about a transverse axis and also about a longitudinal axis, said shaft having cranks at its ends, plow beams journaled on said cranks at opposite sides of said frame, means carried by said frame operatively connected to said shaft to rock the same about a transverse axis and thereby move said beams vertically relatively to the frame, and means operable to rock said shaft relatively to the frame about a longitudinal axis.

4. A lister comprising a main frame, front and rear supporting wheels therefor, a plow carrying shaft intermediately supported by said frame and having cranks at its ends arranged to swing fore and aft, said shaft being adapted to rock about a longitudinal axis relatively to said frame and supporting wheels, a plow carrying frame comprising beams at opposite sides of the main frame, journaled on said cranks, and means connecting the forward ends of said beams together, plows carried by the latter frame, means operatively connected to said shaft to rock the same about a transverse axis to swing said cranks fore and aft, means operatively connected to rock said shaft about a longitudinal axis, and draft means connected with said plow carrying frame.

5. A lister comprising a main frame, supporting wheels therefor, plow carrying means supported by said frame to rock about a transverse axis to raise or lower the plow, and to rock about a longitudinal axis relatively to said frame to level the plow, means operable to rock said plow carrying means to raise or lower the plow, means operable to rock said plow carrying means to level the plow, a plow beam mounted on said plow carrying means, a plow carried by said beam, and ground engaging means supporting the front end portions of said main frame and said plow beam.

6. A lister comprising a main frame, supporting wheels therefor, plow carrying means supported by said frame to rock about a transverse axis to raise or lower the plow, and to rock about a longitudinal axis relatively to said frame to level the plow, means operable to rock said plow carrying means to raise or lower the plow, means operable to rock said plow carrying means to level the plow, a plow beam mounted on said plow carrying means, a plow carried by said beam, ground engaging means supporting the front end portions of said main frame and said plow beam, and means operable to vertically adjust the front end portion of said beam with respect to said frame.

7. A lister comprising a main frame, supporting wheels therefor, spaced brackets rigidly secured to and depending from said frame, a plow carrying shaft supported by said brackets having cranks at its ends arranged to swing fore and aft to raise or lower the plows, and to rock about a longitudinal axis relatively to said frame to level the plows, devices operable to swing said cranks, plow beams at opposite sides of the main frame and connected with said cranks, and ground engaging means supporting the front end portions of said main frame and beams.

8. A lister comprising a main frame, supporting wheels therefor, brackets depending from said frame, a plow carrying shaft supported by said brackets having cranks at its ends arranged to swing fore and aft to raise or lower the plows, and to rock about a longitudinal axis relatively to said frame to level the plows, one of said brackets having a vertically extending slot therein in which a portion of said shaft can rise and fall in the latter rocking movement of said shaft, devices operable to swing said cranks, plow beams at opposite sides of the main frame connected with said cranks, ground engaging means supporting the front end portions of said main frame and beams, and means operable to vertically adjust the front end portions of said beams relatively to said frame.

9. A lister comprising a main frame, supporting wheels therefor, plow carrying means supported by said main frame to rock about a transverse axis to move the plows vertically relatively to said frame, and to rock about a longitudinal axis relatively to said frame to level the plows, a plow frame supported by said plow carrying means, plows carried by the latter frame, means operable to rock said plow carrying means to raise and lower the rear portion of said plow frame, means operable to rock said plow carrying means about a longitudinal axis to level the plows, a fore-truck connected with and supporting the front end portions of said main frame and plow frame from the ground, and means operable to vertically adjust the front end portion of the plow frame relatively to the main frame.

10. A lister comprising a main frame, supporting wheels therefor, plow carrying means supported by said main frame to rock about a transverse axis to move the plows vertically relatively to said frame, and to rock about a longitudinal axis relatively to said frame to level the plows, a plow frame supported by said plow carrying means, plows carried by the latter frame, a fore-truck, means supporting the front end portion of said main frame on said fore-truck, and vertically adjustable means connecting the front end portion of said plow frame with said fore-truck.

11. A lister comprising a main frame, supporting wheels therefor, plow carrying means supported by said frame to rock about a transverse axis and about a longitudinal axis relatively to said frame, a plow beam connected with said plow carrying means, and a fore-truck supporting the front portion of said main frame and connected in direct draft transmitting relation with the front portion of said plow beam, and draft means connected with said fore-truck.

12. A plow comprising a main frame, supporting wheels therefor, a plow beam supported at the rear by said frame for vertical adjustment, a fore-truck connected with the front portion of said frame to swing fore and aft with respect thereto, means connecting the front portion of said plow beam with said fore-truck, and draft means connected with said fore-truck.

13. A plow comprising a main frame, supporting wheels therefor, a plow beam supported at the rear by said frame for vertical adjustment, a fore-truck connected with the front portion of said frame to swing fore and aft, means connecting the front portion of said plow beam with said fore-truck, and means operable to vertically adjust the front portion of said beam.

14. A two-row lister comprising a main frame, supporting wheels therefor, brackets supported by said main frame, one of said brackets having a substantially vertical slot therein, a bail supported by said brackets to rock about a transverse axis, and to rock relatively to said main frame within said slot about a longitudinal axis, a plow-carrying frame carried by said bail, devices operable respectively to rock said bail about a transverse axis and about a longitudinal axis relatively to the main frame, a fore-truck supporting the front portion of the main frame, means connecting the plow frame with the fore-truck for vertical adjustment with respect to the main frame, and draft means connected with said fore-truck.

15. A two-row lister comprising a main frame, supporting wheels therefor mounted in fixed relation thereto, a plow frame, means carried by said main frame operable to raise or lower the plow frame, means operable to rock said plow frame, relatively to said main frame, about a longitudinal axis, a fore-truck supporting the front portion of the main frame and pivotally connected therewith to swing fore and aft relatively thereto, means connecting the plow frame with said fore-truck, and draft means connected with the fore-truck.

16. A plow comprising a main frame, supporting wheels therefor, a plow beam supported at the rear by said frame for vertical adjustment, a fore-truck having a vertical spindle, a sleeve mounted on said spindle and having a link connection with the forward portion of said main frame, to swing fore and aft relatively thereto, and means connecting the plow beam with said sleeve.

17. A plow comprising a main frame, supporting wheels therefor, a plow beam supported at the rear by said frame for vertical adjustment, a fore-truck having a vertical spindle, a sleeve mounted on said spindle and having a link connection with the forward portion of said frame, to swing fore and aft relatively thereto, and vertically adjustable means connecting said plow beam with said sleeve.

18. A two-row lister comprising a main frame, supporting wheels therefor mounted in fixed relation thereto, a plow frame, means carried by said main frame operable to raise or lower the plow frame, means operabe to rock said plow frame, relatively to said main frame, about a longitudinal axis, a fore-truck supporting the front portion of the main frame and pivotally connected therewith to turn laterally and to swing fore and aft relatively thereto, means connecting the plow frame with said fore-truck, and draft means connected with the fore-truck.

19. A two-row lister comprising a main frame, supporting wheels therefor mounted in fixed relation thereto, a plow frame, means carried by said main frame operable to raise or lower the plow frame, means operable to rock said plow frame, relatively to said main frame, about a longitudinal axis, a fore-truck supporting the front portion of the main frame and pivotally connected therewith to turn laterally relatively thereto, means connecting the plow frame with said fore-truck, means for vertically adjusting the front end portion of the plow frame, and draft means connected with the fore-truck.

20. A two-row lister comprising a main frame, supporting wheels therefor mounted in fixed relation thereto, a plow frame, means carried by said main frame operable to raise or lower the plow frame, means operable to rock said plow frame, relatively to said main frame, about a longitudinal axis, a fore-truck supporting the front portion of the main frame and pivotally connected therewith to swing fore an aft relatively thereto, means connecting the plow frame with said fore-truck, means for vertically adjusting the front end portion of the plow frame, and draft means connected with the fore-truck.

21. A two-row lister comprising a main frame, supporting wheels therefor mounted in fixed relation thereto, a plow frame, means carried by said main frame operable to raise or lower the plow frame, means operable to rock said plow frame, relatively to said main frame, about a longitudinal axis, a fore-truck supporting the front portion of the main frame and pivotally connected therewith to turn laterally and to swing fore and aft relatively thereto, means connecting the plow frame with said fore-truck, means for vertically adjusting the front end portion of the plow frame, and draft means connected with the fore-truck.

22. A two-row lister comprising a main frame, supporting wheels therefor mounted in fixed relation thereto, a plow-frame, means carried by said main frame operable to raise or lower the plow-frame, means operable to rock said plow-frame, relatively to said main frame, about a longitudinal axis, a fore-truck having a vertical spindle, a sleeve journaled on said spindle, means pivotally connecting said sleeve with the main frame to permit said sleeve to swing fore and aft relatively thereto, means connecting said sleeve with said plow-frame, and draft means connected with said fore-truck.

23. A two-row lister comprising a main frame, supporting wheels therefor mounted in fixed relation thereto, a plow-frame, means carried by said main frame operable to raise or lower the plow frame, means operable to rock said plow frame, relatively to said main frame, about a longitudinal axis, a fore-truck having a vertical spindle, a sleeve journaled on said spindle, means pivotally connecting said sleeve with the main frame to permit said sleeve to swing fore and aft relatively thereto, means connecting said sleeve with said plow-frame, means carried by the latter connecting means for vertically adjusting the front portion of the plow frame, and draft means connected with said fore-truck.

24. A two-row lister comprising a main frame, supporting wheels therefor mounted in fixed relation thereto, a plow-carrying frame, means carried by said main frame operable to raise or lower the plows, means operable to rock said plow-carrying frame, relatively to said main frame, about a longitudinal axis, a fore-truck having a vertical spindle, a sleeve journaled on said spindle, means pivotally connecting said sleeve with the main frame to permit said sleeve to swing fore and aft relatively thereto, a gooseneck connecting said sleeve with the plow-carrying frame, means for vertically adjusting the front end portion of said plow-carrying frame on said gooseneck, and draft means connected with said fore-truck.

25. A two-row lister comprising a main frame, supporting wheels therefor mounted in fixed relation thereto, a plow-carrying frame, means carried by said main frame operable to raise or lower the plows, means operable to rock said plow-carrying frame, relatively to said main frame, about a longitudinal axis, a fore-truck having a vertical spindle, a sleeve journaled on said spindle, means pivotally connecting said sleeve with the main frame to permit said sleeve to swing fore and aft relatively thereto, a gooseneck connecting said sleeve with the plow-carrying frame, a crank mounted on said gooseneck and connected with the plow-carrying frame for vertically adjusting the same, and draft means connected with said fore-truck.

26. A lister comprising a main frame, supporting wheels therefor mounted in fixed relation thereto, brackets supported by said frame, one of said brackets having a substantially vertical slot therein, a bail supported intermediately by said brackets to rock about a transverse axis and to rock relatively to said main frame within said slot about a longitudinal axis, said bail having cranks at its ends, a plow-frame mounted on said cranks, devices operable respectively to rock said bail about a transverse axis and about a longitudinal axis relatively to the main frame, ground engaging means supporting the front portion of the main frame and connected with said plow frame, and means operable to adjust the front end portion of said plow-frame relative to said main frame.

WALTER H. SILVER.

CERTIFICATE OF CORRECTION.

Patent No. 1,721,716.                        Granted July 23, 1929, to

WALTER H. SILVER.

It is hereby certified that error appears in the printed specification of the above numbered patent requiring correction as follows: Page 8, lines 61, 64, 71, 73, 78, 81, 89 and 91, claims 24 and 25, respectively, for the compound word "plow-carrying" read "plow"; lines 63 and 80, claims 24 and 25, for "plows" read "plow-frames, and line 96, claim 26, after the word "said" insert the word "main"; and that the said Letters Patent should be read with these corrections therein that the same may conform to the record of the case in the Patent Office.

Signed and sealed this 22nd day of October, A. D. 1929.

(Seal)                                              M. J. Moore,
                                                     Acting Commissioner of Patents.